Sept. 10, 1963 A. J. GEHRING, JR., ETAL 3,103,650

SWITCHING DEVICE

Filed March 10, 1959 3 Sheets-Sheet 1

INVENTORS.
ARTHUR J. GEHRING JR.
LLOYD W. STOWE
BY
Fred Fisher
ATTORNEY.

Sept. 10, 1963 A. J. GEHRING, JR., ETAL 3,103,650

SWITCHING DEVICE

Filed March 10, 1959 3 Sheets-Sheet 2

INVENTORS.
ARTHUR J. GEHRING JR
LLOYD W. STOWE
BY Fred Fisher
ATTORNEY.

WRITING OPERATION

| COUNTER STATE: | INPUT ON LINES | ARE RECORDED BY HEADS 12 | ONTO QUADRANT |
|---|---|---|---|
| 00 | 1 | A | I |
| | 2 | B | II |
| | 3 | C | III |
| | 4 | D | IV |
| 01 | 1 | B | I |
| | 2 | C | II |
| | 3 | D | III |
| | 4 | A | IV |
| 10 | 1 | C | I |
| | 2 | D | II |
| | 3 | A | III |
| | 4 | B | IV |
| 11 | 1 | D | I |
| | 2 | A | II |
| | 3 | B | III |
| | 4 | C | IV |

FIG. 3.

READING OPERATION

| COUNTER STATE: | QUADRANT | ARE READ BY HEADS 12 | AND SWITCHED TO OUTPUT LINES |
|---|---|---|---|
| 00 | I | A | 1' |
| | II | B | 2' |
| | III | C | 3' |
| | IV | D | 4' |
| 11 | I | B | 1' |
| | II | C | 2' |
| | III | D | 3' |
| | IV | A | 4' |
| 10 | I | C | 1' |
| | II | D | 2' |
| | III | A | 3' |
| | IV | B | 4' |
| 01 | I | D | 1' |
| | II | A | 2' |
| | III | B | 3' |
| | IV | C | 4' |

*INVENTORS.*
ARTHUR J. GEHRING JR.
LLOYD W. STOWE
BY
Fred Fisher
ATTORNEY

United States Patent Office 3,103,650

Patented Sept. 10, 1963

3,103,650
SWITCHING DEVICE

Arthur J. Gehring, Jr., Haddonfield, N.J., and Lloyd Wesley Stowe, Broomall, Pa., assignors to Sperry Rand Corporation, New York, N.Y., a corporation of Delaware Filed Mar. 10, 1959, Ser. No. 798,548
4 Claims. (Cl. 340—174.1)

Figure 1:
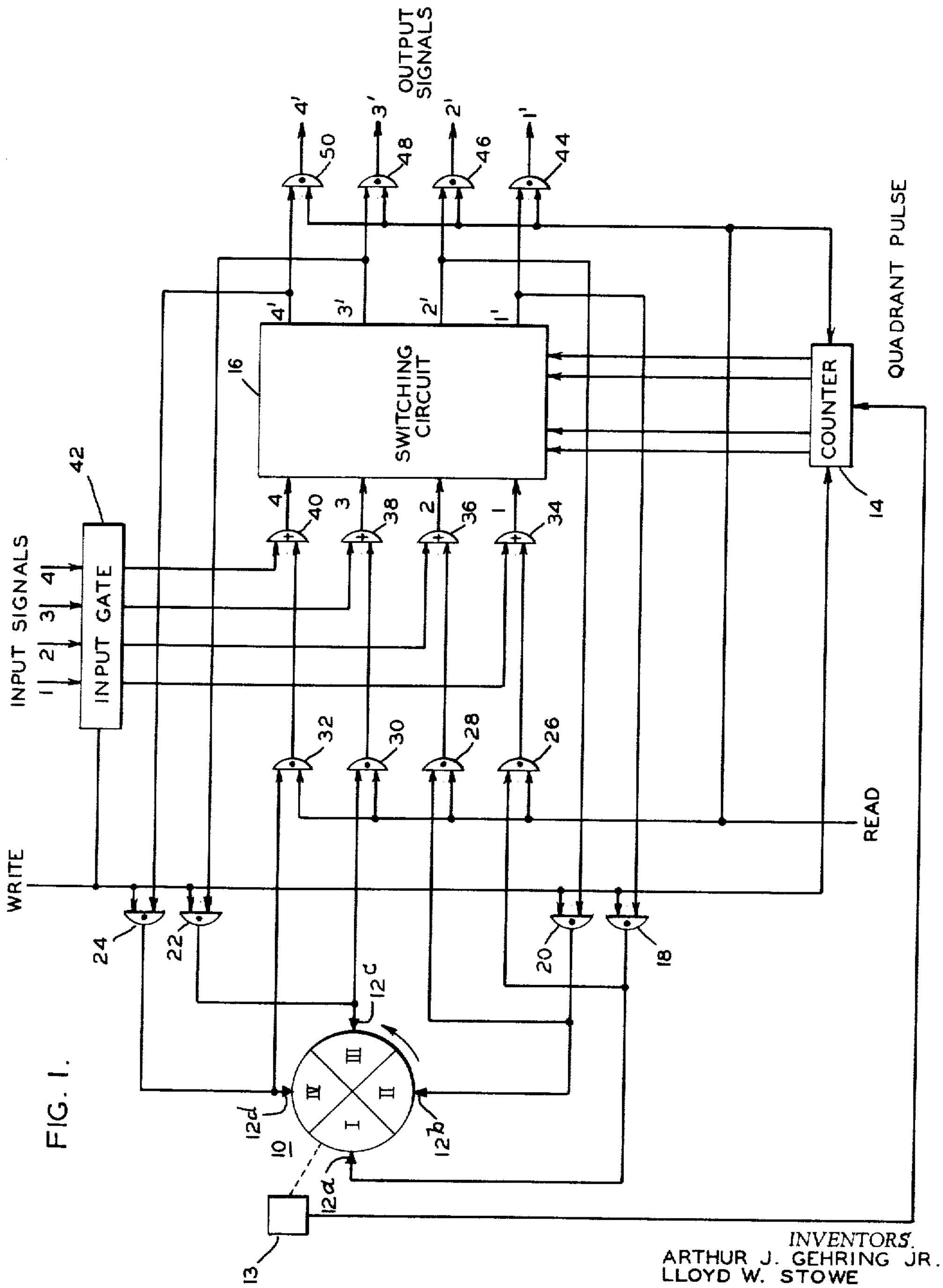

This invention relates, generally, to switching devices. More particularly, this invention relates to switching circuits for switching information to and from magnetic drums.

In modern data computing devices, it is desired that data be recorded onto a magnetic drum, and data read from a magnetic drum, at rapid speed. It is preferable that the rapid access time for recording upon and for reading from the drum be achieved by using a minimum amount of circuitry, including magnetic heads. This invention deals with devices for handling data, wherein information appears on a plurality (e.g. four) of lines, whereby each line carries binary signals representing data information: a "1" is represented by an electrical pulse and a "0" is represented by the absence of a pulse. The signals on each line occur in seriatim. Although, as described more fully hereinafter, these four lines for carrying data information are adapted to carry a four-digit code, other codes, such as a seven-bit code, can be used. Furthermore, this invention is not limited to the return to zero signal notation; other systems of signal notation, such as phase modulation, can be employed.

In accordance with this invention, a magnetic drum, having a track for recording bits of information, has a plurality, e.g. four, of equal sectors. A like plurality of magnetic heads co-operate with the cylindrical surface of the drum with different sectors, respectively, as the drum is rotated. The heads are coupled to switching means. The switching means are adapted to couple a like number of input lines through successively different magnetic heads to communicate with sector portions corresponding to these input lines during a recording operation. The switching means are also adapted to receive information from the plurality of sectors through successively different magnetic heads to a like plurality of output lines corresponding to the sectors during a reading operation.

It is an object of this invention to provide a novel switching device.

It is a further object of this invention to provide a novel magnetic head switching circuit.

Still another object of this invention is to provide novel means for recording information from a plurality of lines onto a magnetic drum, and for reading information from the magnetic drum onto a plurality of output lines.

An additional object of this invention is to provide novel means for recording information occurring on a plurality of input lines onto a magnetic drum at sectors corresponding to the input lines, and to read information from the drum onto output lines corresponding to the information recorded at the respective sectors of the drum.

Figures 1A, 2:
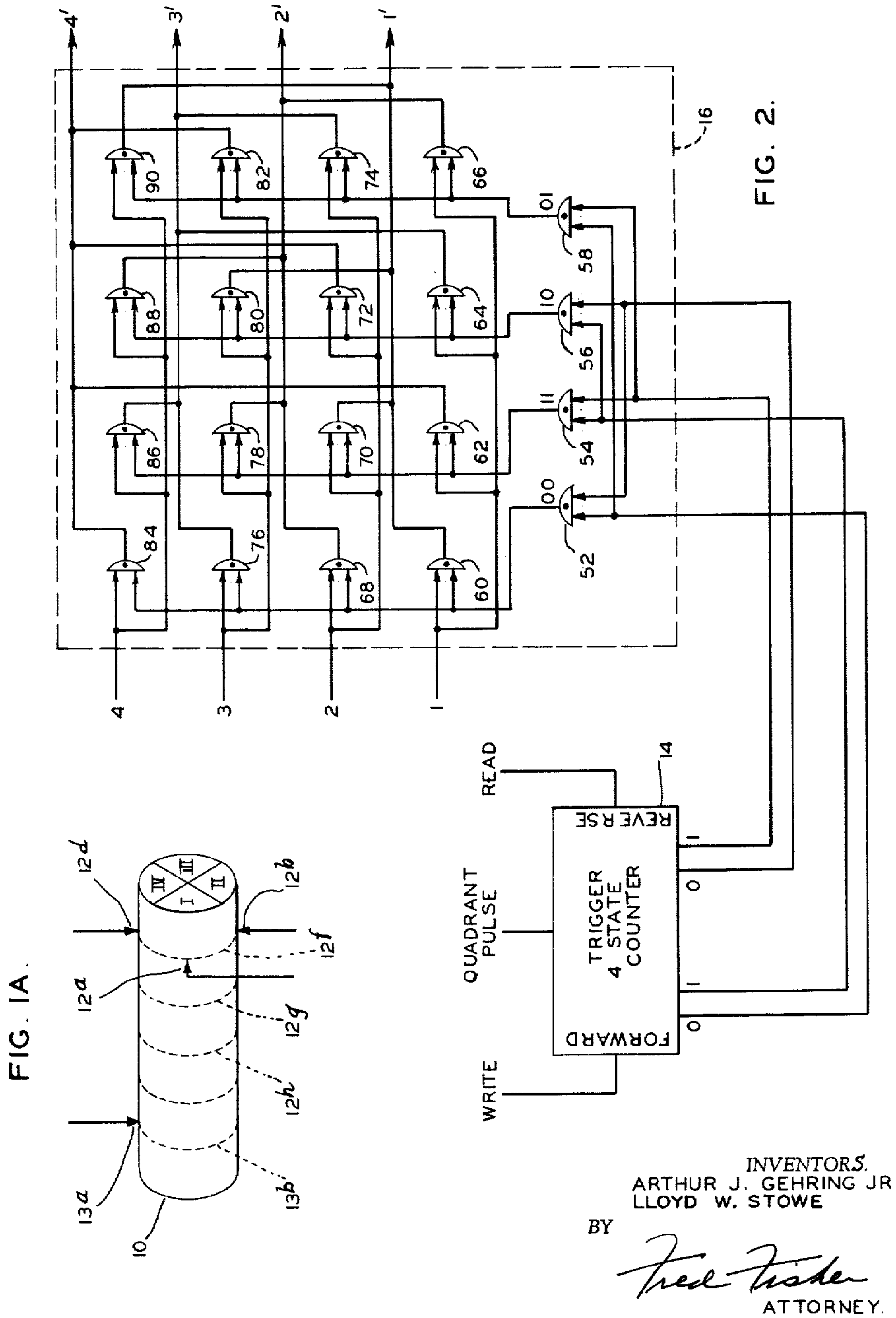

Other objects and advantages of this invention, together with its construction and mode of operation, will become more apparent from the following description when read in connection with the accompanying drawings, in which like reference numerals refer to like parts in the drawings, and in which:

FIGURE 1 is a schematic drawing of one embodiment of this invention;

FIGURE 1*a* is a diagram of a magnetic drum shown in FIGURE 1;

FIGURE 2 is a detailed diagram of a switching circuit shown in FIGURE 1; and

FIGURE 3 contains two charts illustrating the operation of the embodiment shown in FIGURE 1 during the reading and writing operations.

As set forth more fully hereinafter, data is recorded upon a magnetic drum about different portions of its cylindrical surface. Although data is recorded on the drum at in included angle portions of sectors of the drum, the term "sector" is used herein in its broadest sense and includes, as its definition, the included angle of a sector. However, other equivalents, such as the planar figure termed sector, are also included.

Referring to FIGURES 1 and 1*a*, there is shown a magnetic drum 10 having a circumferential track **12*f*. The track 12*f* is divided into four equal parts, termed sectors. These four sectors are identified by the Roman numerals I, II, III, IV. In communication with the track 12*f* are four magnetic heads 12A, 12B, 12C, 12D, displaced 90 degrees from one another. As illustrated in FIGURE 1, when the magnetic head 12A engages with the sector I, the magnetic heads 12B, 12C, and 12D engage with the sectors II, III, and IV, respectively. The magnetic drum 10 is continuously rotated by suitable means, such as a motor (not shown). As the magnetic drum 10 rotates counter-clockwise in the direction shown, the sector I of the drum 10 engages with the magnetic head 12B, at which time the sectors II, III, and IV are in engagement with the magnetic heads 12C, 12D, and 12A, respectively. Subsequent thereto, as the drum continues to rotate, the sector I engages with the head 12C, at which time the sectors II, III, and IV are in engagement with the magnetic heads 12D, 12A, and 12B, respectively. In similar fashion, as the drum rotates, the sector I engages with the head 12D, at which time the sectors II, III, and IV of the magnetic drum 10 engage with the heads 12A, 12B, and 12C**, respectively.

A quadrant pulse producing means 13 produces a pulse every time the heads 12 change sectors; that is, every time the heads 12 enter a new quadrant a pulse is produced by the quadrant pulse producing means 13. According to one embodiment, the means 13 comprises a magnetic reading head **13*a*, in communication with a magnetic track 13*b* on the drum 10; four equally spaced pulses are recorded upon the track 13*b* so that the head 13*a* reads one pulse recorded on the track 13*b*, synchronously with each change of quadrants communicating with the heads 12**.

A four-state counter 14 as illustrated in FIGURE 2 has two pairs of output lines, a left pair and a right pair. The left pair of output lines provides a binary signal of a higher order than the right pair. When one line of a pair has an enabling signal present thereon, no signal is present upon the other line of the pair. The four-state counter 14 is a reversible counter, such as those well-known to the prior art. The counter 14 is adapted to be placed in a "forward" condition upon a "write" signal coupled to the "forward" terminal. The counter 14 is adapted to be placed in a "reverse" condition upon the presence of a "read" signal connected to the "reverse" terminal. The change from a "write" signal to a "read" signal, or from a "read" signal to a "write" signal, occurs when the counter 14 is in its "00" state. The counter 14 changes from one state to a second state by the application of a quadrant pulse to the "trigger" terminal of the counter, as viewed in FIGURE 2. When enabling signals are present upon both "0" terminals, the counter is in its "00" state. When a quadrant pulse is applied to the "trigger" terminal of the counter 14, and a "write"

signal is present on the "forward" terminal, the righthand or lower order portion of the counter changes state so that an enabling signal remains present upon the left-hand "0" terminal and an enabling signal is present upon the right-hand "1" terminal. The counter is then in its "01" state. A subsequent quadrant pulse (when the counter 14 is in its "forward" condition) causes an enabling signal to be present on the left-hand "1" terminal and an enabling signal to be present on the right-hand "0" terminal, thereby causing the counter to be in its "10" state. In similar fashion, a subsequent quadrant pulse causes the counter to achieve its "11" state. Still further subsequent pulses cause the counter 14 to completely cycle and achieve its "00" state and continue on in its "forward" mode of operation to the "01" state, "10" state, etc.

During the reading operation, the "write" pulse is removed from the "forward" terminal and a "read" pulse pulse is present at the "reverse" terminal of the counter 14. The counter 14 then counts backwards in the order "00," "11," "10," "01," and continues on to "00" etc. Counter 14 is well-known to the prior art and comprises, for example, a pair of bistable devices coupled to each other in cascade to form a two-stage, four-state binary counter.

The counter 14 is synchronized so that it is always in its "00" state when the magnetic head 12A is in communication with the quadrant I of the drum 10. Suitable jamming signals (not shown) from the drum 10 can be used to initially set the counter 14 in its proper state upon turning on the equipment. The four-state counter means, used in combination with the circuitry described, is not limited to the specific counter 14 illustrated. The four-state counter means can comprise, in lieu of the counter illustrated, a pair of set-reset flip-flops having input gates coupled to receive "sentinel" signals stored on the drum, whereby the flip-flops are jammed to provide the desired outputs in the order described. The sentinel signals can be on a separate track **12*h* of the drum 10 for both jamming the counter 14**, and for providing proper timing for inaugurating the "read" and "write" signals. The "read" and "write" signals can be supplied from the control portion of a computer or from another external source, not shown.

Referring again to FIGURE 1, the output of the counter 14 is connected to a switching circuit 16, further described hereinafter with respect to FIGURE 2. The "write" signal, in addition to being connected to the counter 14, is connected to four "write" "and" gates 18, 20, 22, 24, having their outputs connected, respectively, to the magnetic heads 12A, 12B, 12C, 12D.

An "and" gate, also known as a coincidence gate, is illustrated in the drawing as a semicircle with a dot in the center to represent the logical "and" function. The "and" gate provides an enabling output signal upon the presence of enabling signals upon all of its input terminals.

An "or" circuit is illustrated as a semicircle with a + symbol within the semicircle to represent the logical "or" function. An "or" circuit provides an enabling output signal upon the presence of an enabling signal upon any one of its input terminals. An "or" circuit acts as a buffer by isolating its various input lines to prevent spurious feedback.

Referring once again to FIGURE 1, there are shown four "read" "and" gates 26, 28, 30, and 32. A line for carrying the "read" signal, in addition to being connected to the counter 14, is connected to one input of each of the "read" gates 26, 28, 30, and 32. The outputs of the four "write" gates 18, 20, 22, and 24 are connected, respectively, to the remaining inputs of the "read" gates 26, 28, 30, and 32. Therefore, by such a connection, the "read" gates 26, 28, 30, and 32 are adapted to receive signals, respectively, from the reading heads 12A, 12B, 12C, and 12D.

The outputs of the "read" gates 26, 28, 30, and 32 are connected, respectively, through "or" circuits or buffers 34, 36, 38, and 40, respectively, to the first, second, third, and fourth input terminals of the switching circuit 16.

A four-digit binary code appears on the input lines 1, 2, 3, and 4 which are connected to an input gate 42. The four outputs of the input gate 42 are connected, respectively, to the corresponding "or" circuits 34, 36, 38, and 40. The input gate 42 "opens" upon the presence of an enabling "write" signal applied thereto. The input gate 42 has four "and" gates connected in a similar fashion as the other gates illustrated in the figures, but has been so illustrated in order to simplify the drawing.

The switching circuit 16 has four output terminals, which, when the counter is in the "00" state, provides signals corresponding to the signals appearing on the input lines 1, 2, 3, and 4 onto the output lines 1′, 2′, 3′, and 4′, respectively. Corresponding output terminals of the switching circuit are connected, respectively, to output "and" gates 44, 46, 48, and 50, respectively, and to the "write" gates 18, 20, 22, and 24; the "read" instruction signal being connected to the other terminals of the output gates 44, 46, 48 and 50.

The switching circuit 16 is illustrated in greater detail in FIGURE 2. The input signals, in four-digit binary code, occur, respectively, on the input lines 1, 2, 3, and 4. The line 1 is connected to one input terminal of each of the bottom row of two-input "and" gates 60, 62, 64, and 66. The line 2 is connected to one input terminal of each of the second row of two-input "and" gates 68, 70, 72, and 74. The third line, line 3, is connected to one input terminal of each of the third row of two-input "and" gates 76, 78, 80, and 82. In similar fashion, the fourth line is connected to one input terminal of each of the top row of two-input "and" gates 84, 86, 88, and 90.

The right-hand "01" lines of the four-state counter 14 are connected, respectively, to one input of each of the two-input "and" gates 52, 56 and to one input of each of the two-input "and" gates 54, 58. The left-hand "01" lines of the counter 14 are connected to the other input of the "and" gates 52, 58 and 54, 56, respectively. Therefore, the gate 52 provides an enabling output when the counter 14 is in its "00" state; the gate 58 provides an enabling output when the counter 14 is in its "01" state; the gate 56 provides an enabling output when the counter 14 is in its "10" state; and the gate 54 provides an enabling output when the counter 14 is in its "11" state. The output of the gate 52 is connected to the other input terminals of the left column of "and" gates 60, 68, 76, and 84. The output of the gate 54 is connected to the other input terminals of the adjacent column of "and" gates 62, 70, 78, and 86. In similar fashion, the output of the "and" gate 56 is connected to the other input terminals of the next column of "and" gates 64, 72, 80, and 88; and the output of the "and" gate 58 is connected to the right column of "and" gates 66, 74, 82, and 90. The outputs of the "and" gates 60, 70, 80, and 90 are connected to the output line 1′; the outputs of the "and" gates 68, 78, 88, and 66 are connected to the output line 2′; the outputs of the "and" gates 76, 86, 64, and 74 are connected to the output line 3′; and the outputs of the "and" gates 84, 62, 72, and 82 are connected to the output line 4′.

The operation of the system is best illustrated by referring to FIGURE 3. During the writing operation, enabling signals are present on the "write" line; no signals are present upon the "read" line. During the writing operation, when the counter 14 is in the "00" state, input signals appearing upon the input lines 1, 2, 3, and 4 are recorded, respectively, by the heads 12A, 12B, 12C, and 12D onto the quadrants I, II, III, and IV, respectively. When the counter achieves its "01" state, "10" state, and "11" state, the signals appearing upon the input lines 1, 2, 3, and 4 are recorded by the proper heads 12 onto the corresponding quadrants I, II, III, and IV, as shown in FIGURE 3.

During the reading operation, when an enabling signal appears upon the "read" line, no signal being upon the "write" line, the counter 14 counts in reverse or backwards (see FIG. 3). When the counter is in its "00" state, information recorded in the quadrants or sectors I, II, III, and IV are read, respectively, by the heads 12A, 12B, 12C, and 12D onto the output lines 1', 2', 3', and 4', respectively. The counter 14 then changes its state to its "11" condition, then to its "10" and "01" conditions. During these states, information occurring on the quadrants I, II, III, and IV are read by the proper heads 12 and switched onto the output lines 1', 2', 3', and 4', respectively, as shown in FIGURE 3.

Referring again to FIGURE 1, during a "write" operation, input signals are passed through the input gate 42 through the "or" circuits 34, 36, 38, and 40, switched to the proper output terminals of the switching circuit 16, passed through the "write" gates 18, 20, 22, and 24 (respectively when the counter is in its "00" state) onto "write" heads 12A, 12B, 12C, and 12D, whereby signals on the input line 1 are recorded onto the quadrant I, signals on the input line 2 are recorded onto the quadrant II, signals on the input line 3 are recorded onto the quadrant III, and signals on the input line 4 are recorded onto the quadrant IV. All of the data on the four input lines are recorded on one track **12*f* by the four heads 12A, 12B, 12C, and 12D**.

During a "read" operation, the data read by the heads 12A, 12B, 12C, and 12D are passed, respectively, through the "read" gates 26, 28, 30, 32 and the "or" circuits 34, 36, 38, 40 to the switching circuit 16, and out through the output gates 44, 46, 48, 50. Data on the output lines 1', 2', 3', and 4' correspond to the data recorded on the track **12*f*** of the quadrants I, II, III, and IV, respectively.

Other embodiments and modifications of this invention can be made without departing of the spirit of this invention. For example, as has been constructed and successfully operated, a seven binary-digit code, representing as many as 64 different characters together with a parity check bit, has been used in connection with the high speed printer disclosed in our copending application, S.N. 753,512, filed August 6, 1958. When using a seven-bit code, it is desirable to use eight heads: four heads 12A, 12B, 12C, 12D on the track **12*f*** (as shown in FIG. 1*a*); four heads on another track **12*g*. Three of the quadrants on the track 12*g* store information, the fourth track being vacant. Four heads, however, are used in conjunction with the track 12*g* though only three heads at any one time are actuated. The circuit for the four-bit code, as shown in FIGURE 1, is duplicated for the remaining three-bit code; however, only three of the four output lines are necessary for the duplicated circuitry, the gate 50 being idle. In addition, the quadrant counter 14 need not be duplicated; the outputs from the counter 14 can be branched to provide signals to two sets of duplicate switching circuitry 16**.

As shown in FIGURE 1, any signal recorded on the drum is read in a maximum of one-fourth of a revolution of the drum 10. Access time to the drum, therefore, is greatly improved, in comparison with the time required if but one head were used. In another embodiment, information can be recorded on the drum a plurality of times, e.g., in triplicate, whereby information can be read from the drum 10 in a maximum of one-twelfth of a revolution of the drum. In accordance with the successfully operated embodiment of this invention operated in connection with the printer described in the aforesaid application, two tracks for recording a seven-bit code are used, the information being recorded in triplicate so that data can be read from the drum at a very fast rate of speed.

What is claimed is:

1. In combination, a magnetic drum having a magnetic track thereon, said magnetic track having $m$ equal portions thereby defining $m$ equal sectors about said drum, $n$ input lines, $n$ output lines, wherein $m$ and $n$ are each an integer greater than unity, and wherein $m \geqslant n$; a reversible ring counter coupled to be stepped at each sector of the drum; and switching means for recording signals from said input lines onto corresponding sectors of said drum and for reading signals stored on said sectors of said drum to corresponding output lines; said switching means being switched in accordance with the state of said ring counter; said ring counter adapted to count in one direction during a reading operation and in the opposite direction during a recording operation.

2. In combination, a magnetic drum having a magnetic track thereon, said magnetic track having $m$ equal portions containing included angles of corresponding sectors of said drum, $n$ input lines, $n$ output lines, wherein $m$ and $n$ are each an integer greater than unity, and switching means for recording signals on said input lines onto corresponding sectors of said magnetic drum and for reading signals stored on said magnetic drum onto said output lines corresponding to said sectors of said drum; said switching means being switched in accordance with the state of said ring counter; said ring counter adapted to count in one direction during a reading operation and in the opposite direction during a recording operation.

3. In combination, a cyclically movable medium having first, second, third and fourth equal portions thereon for the storage of information; first, second, third, and fourth means for recording upon and reading from said first, second, third, and fourth portions in cyclical order; first, second, third, and fourth input lines; first, second, third, and fourth output lines; a four-state reversible counter coupled to be stepped at each said portion of said medium; and switching means for cyclically connecting said input lines to said recording and reading means and for cyclically connecting said recording and reading means to said output lines for causing signals on said first, second, third, and fourth input lines to be stored in said first, second, third, and fourth portions, respecfively, and for reading signals stored in said first, second, third, and fourth portions onto said first, second, third, and fourth output lines, respectively; said switching means being switched in accordance with the state of said counter; said counter adapted to count in one direction during a reading operation and in the opposite direction during a recording operation.

4. In combination, a magnetic drum having a track with first, second, third, and fourth equal portions thereon; four magnetic heads for communication with said magnetic track; first, second, third, and fourth input lines; first, second, third, and fourth output lines; switching means; reversible four-state counter means; means for changing the state of said counter means as different sectors of said drum communicate with said magnetic heads; means for receiving a "write" signal, said "write" signal receiving means being coupled to said counter means for causing said counter means to count in a first direction; means for receiving a "read" signal, said "read" signal receiving means being coupled to said counter means for causing said counter means to count in a second direction; an input gating circuit, said gating circuit being coupled to receive said first, second, third, and fourth input lines, said "write" signal receiving means being coupled to said gating circuit for passing input signals on said first, second, third, and fourth input lines through said gating circuit to said switching means when a "write" signal is present; output gating means being coupled to receive signals from said switching means and connected to receive said "read" signal receiving means for providing output signals upon said first, second, third, and fourth output lines during the presence of a "read" signal; "write" gating means coupled to receive signals from said switching means for passing information upon the application of a "write" signal, the output of said "write" gating means being coupled to said magnetic heads;

"read" gating means being coupled to pass information read by said magnetic heads, upon the application of a "read" signal, to said switching means; and means for coupling said counter means to said switching means for causing information at the inputs of said switching means to be switched to different outputs of said switching means as the state of the counter means is changed, for causing information on said first, second, third, and fourth input lines to be recorded in said first, second, third, and fourth portions of said magnetic track, respectively, and for reading signals stored in said first, second, third, and fourth portions of said magnetic track onto said first, second, third, and fourth output lines, respectively.

References Cited in the file of this patent

UNITED STATES PATENTS

| | | |
|---|---|---|
| 2,813,261 | Scully et al. | Nov. 12, 1957 |
| 2,866,179 | Haanstra et al. | Dec. 23, 1958 |
| 2,907,009 | Lesser | Sept. 29, 1959 |

UNITED STATES PATENT OFFICE
CERTIFICATE OF CORRECTION

Patent No. 3,103,650 September 10, 1963

Arthur J. Gehring, Jr., et al.

It is hereby certified that error appears in the above numbered patent requiring correction and that the said Letters Patent should read as corrected below.

Column 6, line 15, after "unity," insert -- a reversible ring counter coupled to be stepped at each sector of the drum, --.

Signed and sealed this 21st day of April 1964.

(SEAL)
Attest:

ERNEST W. SWIDER
Attesting Officer

EDWARD J. BRENNER
Commissioner of Patents